United States Patent [19]

Black et al.

[11] Patent Number: 5,167,148
[45] Date of Patent: Dec. 1, 1992

[54] FRICTIONAL PROPERTIES TEST MECHANISM

[75] Inventors: Raymond J. Black, South Bend; Shrikant Awasthi, Granger, both of Ind.

[73] Assignee: Allied-Signal Inc., Morristown, N.J.

[21] Appl. No.: 728,451

[22] Filed: Jul. 11, 1991

[51] Int. Cl.$^5$ .......................................... G01M 19/00
[52] U.S. Cl. .................. 73/121; 73/862.13; 73/9
[58] Field of Search ............... 73/121, 862.13, 862.16, 73/862.18, 9

[56] References Cited

U.S. PATENT DOCUMENTS

| | | | |
|---|---|---|---|
| 3,146,619 | 9/1964 | Sinclair et al. | 73/121 |
| 3,208,266 | 9/1965 | Black | 73/9 |
| 3,412,603 | 11/1968 | Obarski | 73/121 |
| 3,444,720 | 5/1969 | Link | 73/9 |
| 4,051,713 | 10/1977 | Bao et al. | 73/9 |

FOREIGN PATENT DOCUMENTS

| | | | |
|---|---|---|---|
| 56-142425 | 11/1981 | Japan . | |
| 62-832 | 1/1987 | Japan . | |
| 717578 | 2/1980 | U.S.S.R. . | |
| 867733 | 9/1981 | U.S.S.R. . | |
| 926555 | 5/1982 | U.S.S.R. | 73/121 |
| 1041363 | 9/1983 | U.S.S.R. . | |

Primary Examiner—Jerry W. Myracle
Attorney, Agent, or Firm—Larry J. Palguta; Leo H. McCormick; Robert A. Walsh

[57] ABSTRACT

The frictional properties test mechanism (10) comprises a shaft dynamometer (12) connected with a wheel element (14) that is coupled with a braking mechanism (16) for the wheel element (14). The braking mechanism comprises a single rotor (25)/double stator (27) disc brake whose torque tube (29) is attached to a piston housing (40) and torque load cell (54). The piston housing (40), torque armature end plate (41), and torque load cell (54) are mounted by way of bearings (95) within a stationary framework (100), and connected with an oscillatory motion mechanism (18). Located adjacent the stationary framework (100) and connected by arms (24) to the end plate (41) and torque load cell (54) is a pair of spring mechanisms (20) and a pair of hydraulic cylinders (22), which are part of the oscillatory motion mechanism (18). A control and display console (121) operates the dynamometer (12) in order to effect rotary motion of the wheel element (14) and operation of the braking mechanism (16). The oscillatory motion mechanism (18) imparts a slight oscillatory or sinusoidal motion to the end plate (41), torque load cell (54), piston housing (40), torque tube (29) and stators (27) via the hydraulic cylinders (22), spring mechanisms (20), and arms (24). The sinusoidal motion of the stators (27) effects an incremental velocity and incremental torque and enables the determination, via a high speed data acquisition system (190) and computerized data reduction (120, 122, 123), of frictional properties of the brake mechanism (16).

35 Claims, 7 Drawing Sheets

FRICTIONAL PROPERTIES TEST MECHANISM

The present invention relates generally to a frictional properties test mechanism, and in particular to a frictional properties test mechanism for an aircraft brake.

It is desirable to test aircraft brakes as thoroughly as possible in order to determine a maximum number of braking characteristics and provide a full and complete understanding of brake operation. Aircraft brakes, and in particular aircraft brakes having carbon-carbon composite brake discs, may operate quite differently depending upon the types of materials and processes utilized in manufacturing the carbon-carbon composite brake discs. Sometimes the carbon-carbon composite brake discs will produce a vibration or brake "squeal" during use within an aircraft brake. It is desirable to provide a test mechanism which will provide an accurate determination and measurement of the frictional properties of carbon-carbon friction discs, as well as any other type of brake discs which may be tested thereon. The testing of a full scale brake might involve the use of six rotors, five stators, a pressure plate and a backing plate. It is advantageous that less than a full scale brake be utilized, but yet provide data that is characteristic of such a brake. The type of data desired would provide, among other things, information relating to vibration and what is known as "negative damping". Negative damping is essentially a relationship between velocity oscillation and torque oscillation of the brake. In other words, when an incremental velocity is imposed on top of the slowly varying mean slip velocity of the rotors and stators of a disc brake, this in turn generates an incremental torque. The ratio between an incremental torque and an incremental velocity may be determined via instrumentation, high speed data acquisition and computerized data reduction, and this ratio is known as "negative damping". Another way of defining negative damping is the partial derivative of brake torque with respect to slip velocity. The vibrations or brake "squeal" produced by negative damping may be described as torsional oscillations of the stationary parts of the braking system. Therefore, in order to generate data relating to negative damping, it is desirable that the normally stationary parts of the braking system have imposed torsional oscillations thereupon.

In addition to the negative damping, it is also desirable to determine the instantaneous variation of torque with applied brake pressure. This is also a partial derivative, i.e. the partial derivative of torque with respect to brake pressure.

In addition it is also desirable to determine how torque varies with brake friction material temperature. This is also a partial derivative, i.e. the partial derivative of torque with respect to friction material temperature.

The present invention provides solutions to the above problems by providing a brake test mechanism, comprising means for providing inertial rotary motion, a wheel element attached to the inertial rotary motion means, means for effecting braking of said wheel element and including braking load receiving means, means for creating oscillatory motion of said braking load receiving means, and means for controlling the test mechanism and for data acquisition, so that rotation of said wheel element by the inertial rotary motion means and operation of the oscillatory motion means to effect oscillatory motion of the braking load receiving means during operation of the braking means enables the acquisition of data relative to the operation of said braking means.

One way of carrying out the invention is described in detail below with reference to the drawings which illustrate an embodiment in which:

FIG. 3A is an enlarged section view of the piston and adjuster mechanism of FIG. 3;

Figure 1:
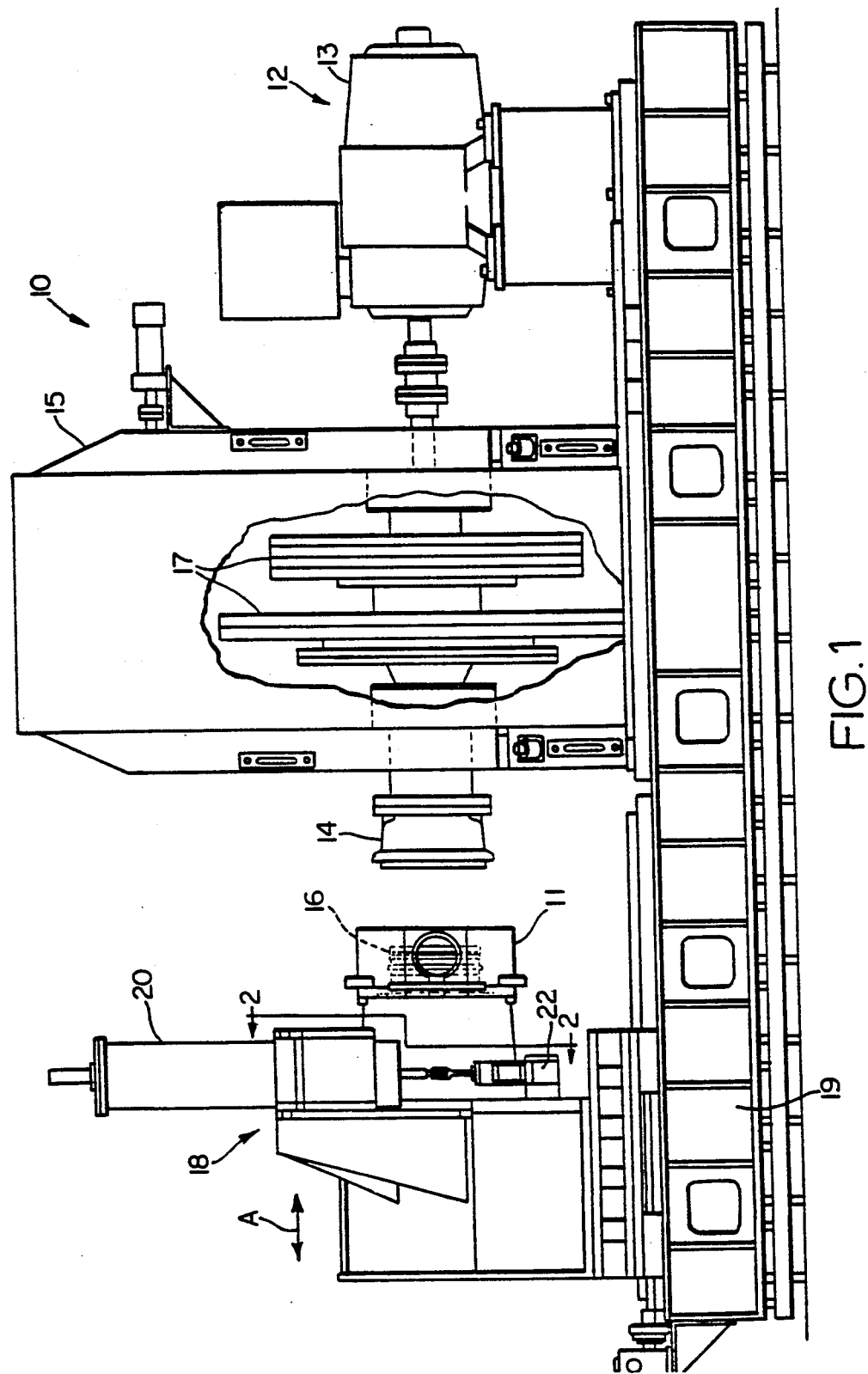
FIG. 1 is a view of most of the frictional properties test mechanism of the present invention.
Figure 2:
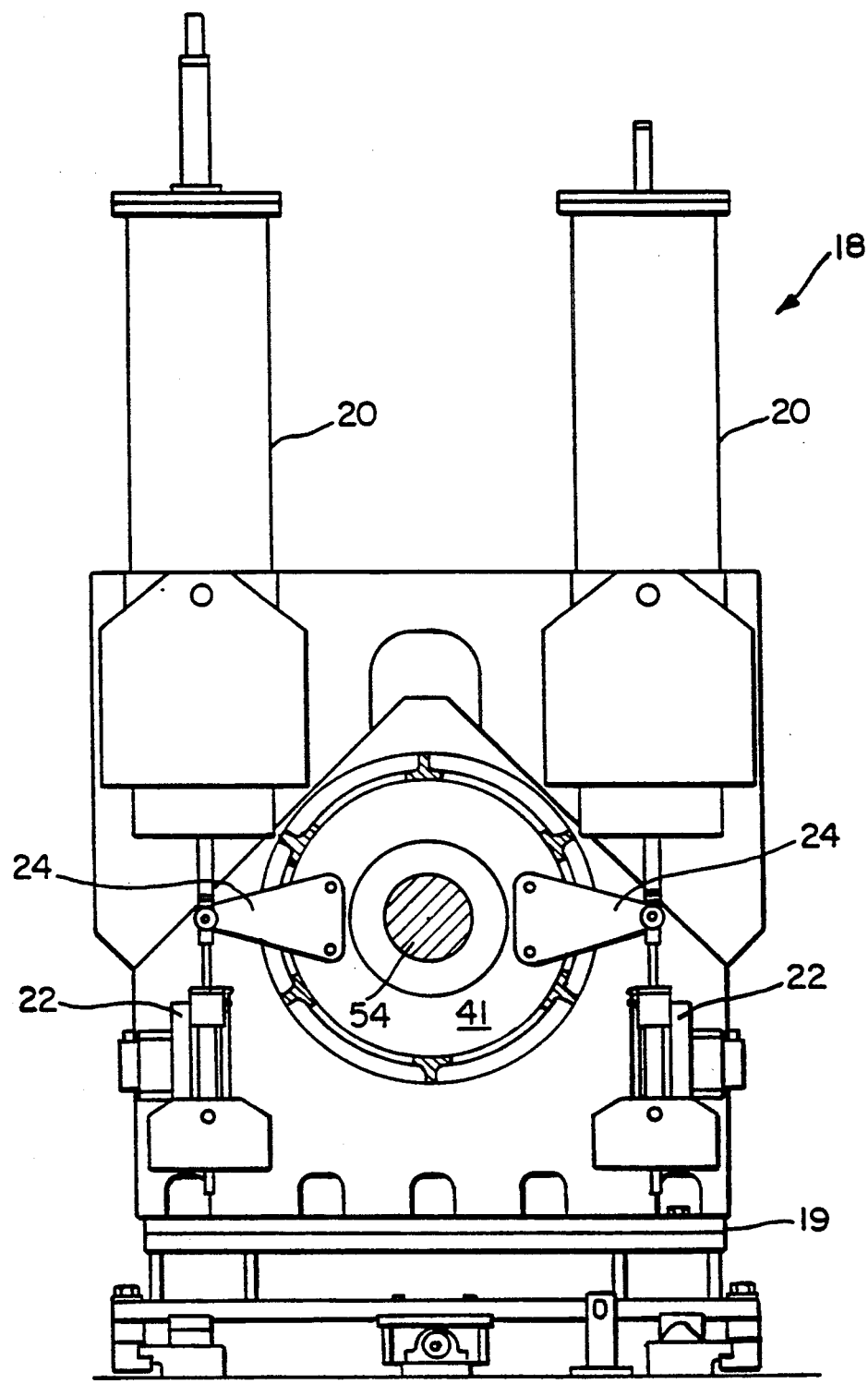
FIG. 2 is an end view of the test mechanism of FIG. 1.

FIG. 1 is a view of most of the frictional properties test mechanism of the present invention. The test mechanism is designated generally by reference numeral 10 and comprises dynamometer 12 attached to a wheel half or wheel element 14 which may be engaged with a brake mechanism or braking means 16 operatively connected with an oscillatory motion mechanism or means 18. Shaft dynamometer 12 includes drive motor 13 connected with inertia section 15. Inertia section 15 comprises a plurality of large, heavy flywheels or discs 17 which are typically used in dynamometers. Oscillatory motion or perturbation motion means 18 is mounted for slidable lateral movement upon bed 19 in the direction of Arrows A so that braking means 16 can be engaged with wheel element 14. Oscillatory motion means 18 includes a pair of spring mechanisms 20 disposed opposite from a pair of hydraulic cylinders 22 (see FIG. 2), and the spring mechanisms 20 and cylinders 22 being connected with each other at laterally extending device arms 24. Device arms 24 are operatively connected with braking means 16.

Figure 3:
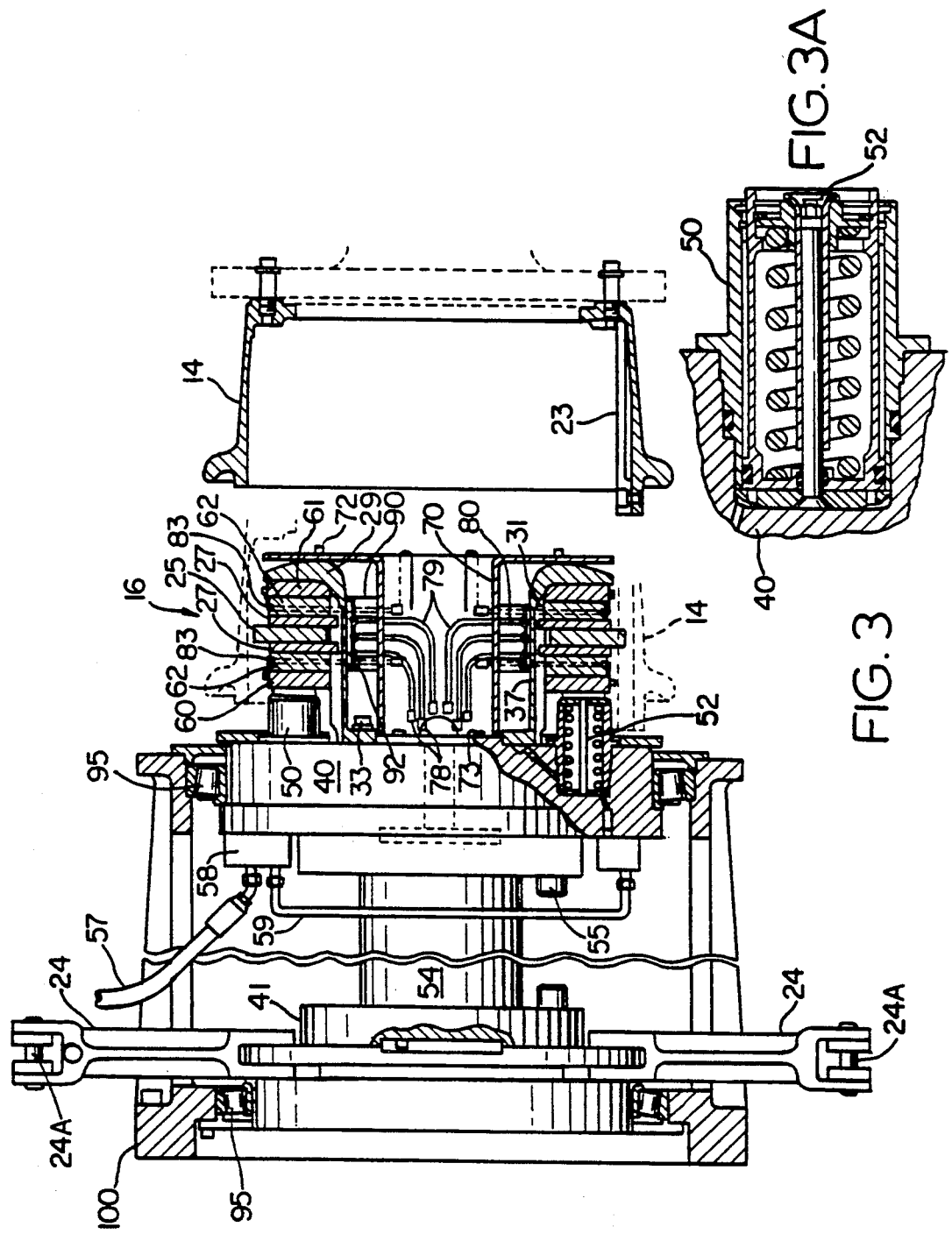
FIG. 3 is an enlarged section view of a portion of the test mechanism with left side rotated 90° to illustrate the torque armature end plate and laterally extending device arms.

Referring to FIG. 3, there is illustrated an enlarged partial section view of test mechanism 10. Braking means 16 comprises a single rotor brake which decelerates the large shaft dynamometer inertial fly wheels 17. For the purpose of clarity, the vented shroud 11 in FIG. 1 is not shown in FIG. 3. The inertia and speed of the fly wheels is variable to simulate various brake application speeds and effective airplane masses. Wheel element 14 attached to dynamometer 12 is shown separated from braking means 16 in order to provide access to the braking means, and is also shown in dotted line to represent its operational position when it is coupled with braking means 16. Wheel element 14 comprises a typical aircraft wheel half which includes drive lugs 23 (only one shown) that engages slots within carbon-carbon composite rotor disc 25. On each side of rotor 25 is a stator 27 which together form the nonrotating part of a friction pair 25, 27 comprising the rotor and stators. The stators are keyed to torque tube 29 by means of lugs 31 which engage slots within the carbon-carbon composite stators. Torque tube 29 is connected by a plurality of bolts 33 to piston housing 40. Piston housing 40 contains a plurality of typical aircraft brake pistons 50 with the lower piston 50 being illustrated in enlarged section view in FIG. 3A. Each piston 50 may contain an internal ball-and-tube adjuster mechanism 52, as is well-known in the prior art. Piston housing 40 is connected via bolts 55 to torsional or torque load cell 54. Torsional load cell 54 is connected with a torque armature end plate 41 having a pair of laterally extending arms 24 (see also FIG. 2). Piston housing 40 and torque load cell 54 are mounted to stationary framework 100 by means of rotary bearings 95. Bearings 95 permit armature end plate 41, torque load cell 54, piston housing 40, torque tube 29, and stators 27 to move relative to stationary framework 100 and rotor 25. When braking means 16 is activated during operation of the test mechanism 10, braking load is received by torque tube 29, piston housing 40, torsional load cell 54, torque armature end plate 41, and laterally extending arms 24, all of which may comprise a braking load receiving mechanism portion of the braking means 16. The braking load receiving mechanism or means can also comprise a more direct attachment of arms 24 to torque tube 29. Connected with housing 40 is hydraulic feed hose 57 communicating with manifold 58 that supplies fluid pressure via a plurality of connections 59 to the pistons 50. Each piston 50 engages pressure plate 60 which is disposed opposite from backing plate 61. Plates 60, 61 each include carbon-carbon composite frictional material 62 attached thereon and engaging the respective stators 27. Insulator tube 70 is attached by bolts 72 to torque tube 29 and also connected by bolts 73 with piston housing 40. Located within insulator tube 70 is a plurality of electrical connectors 78 to which are attached electrical cables 79 which extend radially outwardly to heater elements 80 which lay circumferentially about heater support cylinder 90. Heater support cylinder 90 is attached by bolts 92 to internal opening surface 37 of torque tube 29. A separate set of heater elements 83 extend beyond insulator plate 70 and extend around the carbon-carbon composite friction materials 62. In addition to creating realistic operating temperatures for the friction pair, the heater elements 80, 83 can create higher than normal operating temperatures.

Figure 4:
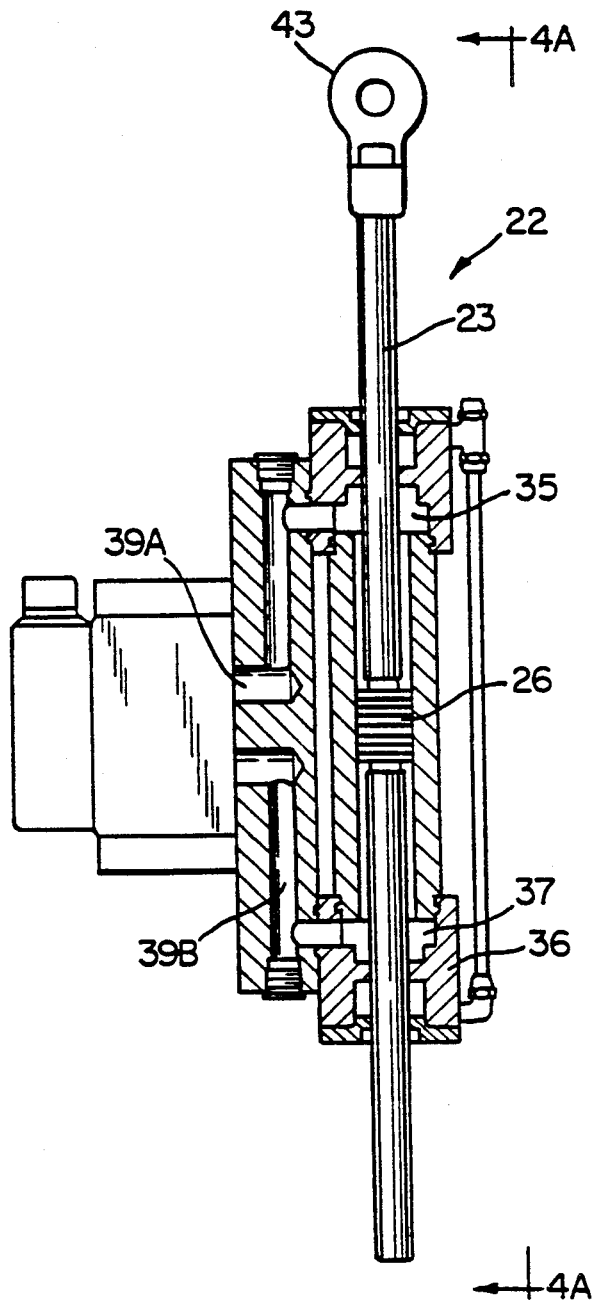
FIG. 4 is a section view of one of the pair of hydraulic cylinders.
Figure 4A:
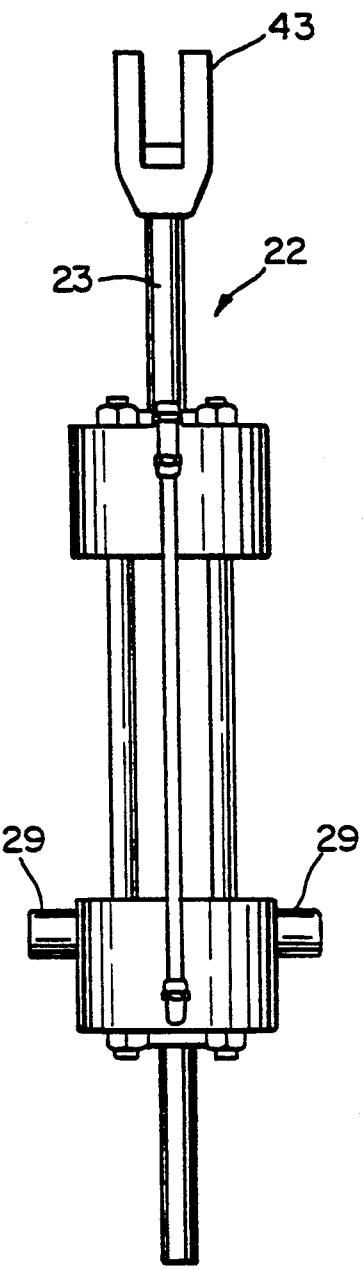
FIG. 4A is a view taken along view line 4A—4A of FIG. 4.
Figure 6:
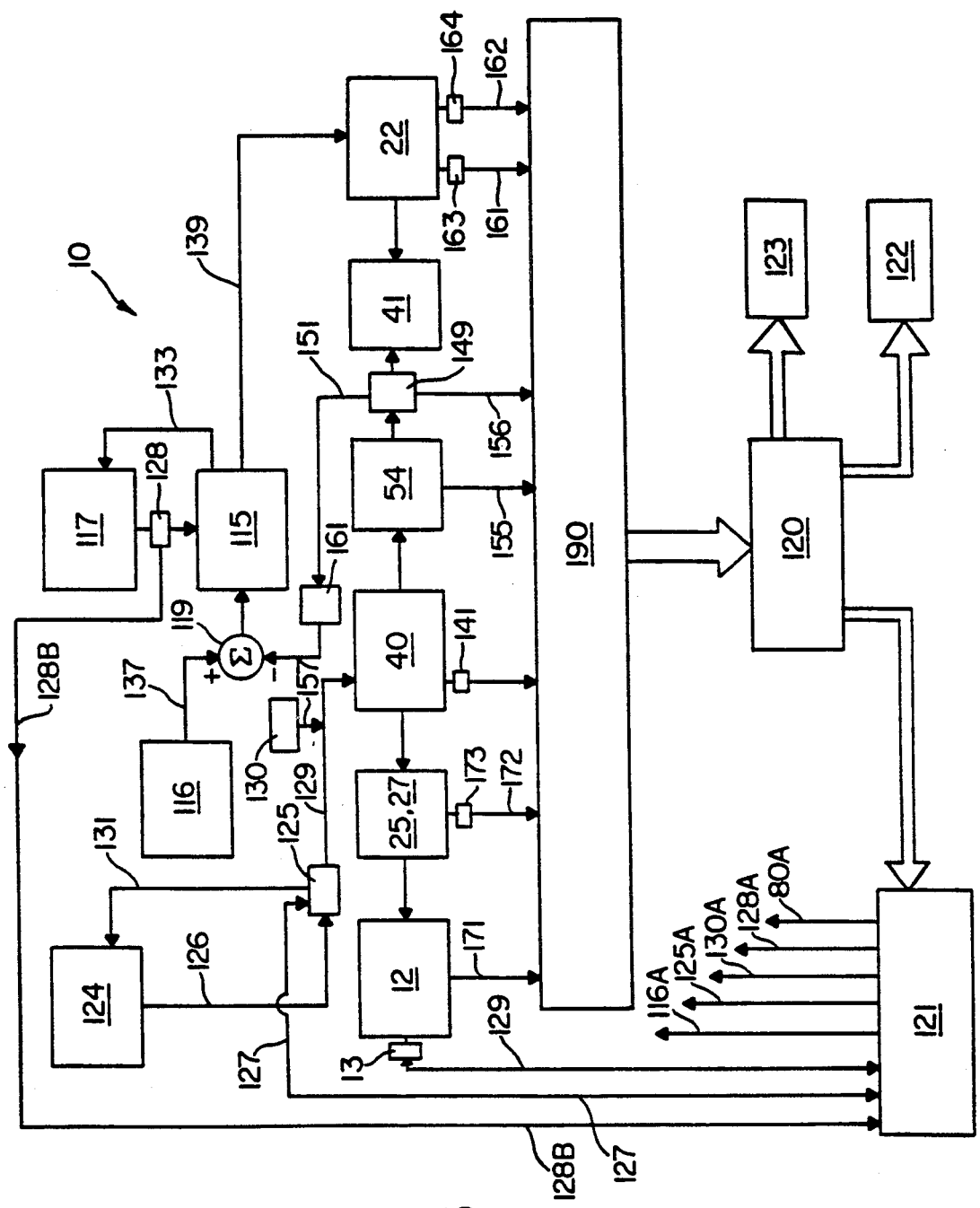
FIG. 6 is a schematic chart of the frictional properties test mechanism.

Referring to FIG. 4, there is illustrated in section view one of the hydraulic cylinders 22. Each hydraulic cylinder 22 comprises piston rod 23 connected with internal piston 26 located within piston housing 36. Piston housing 36 includes a pair of oppositely disposed pressure chambers 35, 37 which may receive or exhaust hydraulic fluid pressure via passageways 39A and 39B. As illustrated in FIG. 4A, cylinders 22 include bottom trunnions 29 which attach rotatably to a stationary portion of oscillatory motion means 18. The top of each piston rod 23 includes clasp 43 for receiving a not shown pin 24A (see FIG. 3) that connects the piston rod to the respective laterally extending arm 24 (see FIG. 2). Hydraulic cylinders 22 are connected hydraulically crisscross and are driven by a sine wave generator, a servo valve, and a hydraulic power source as illustrated in FIG. 6.

Figure 5A:
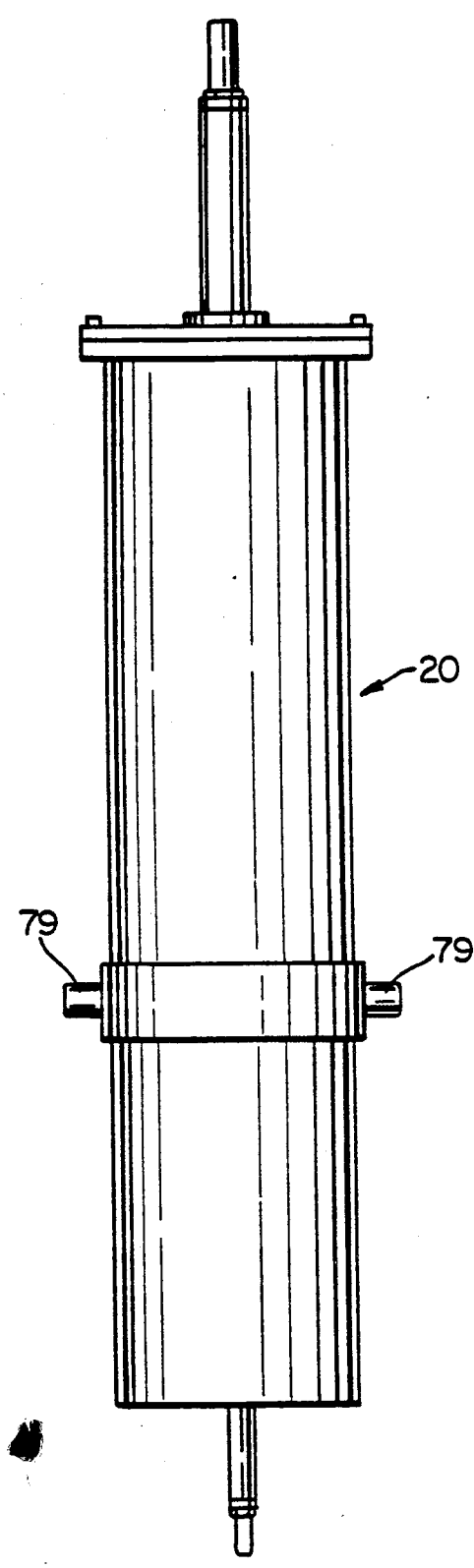
FIG. 5A is a view taken along view line 5A—5A of FIG. 5.
Figure 5:
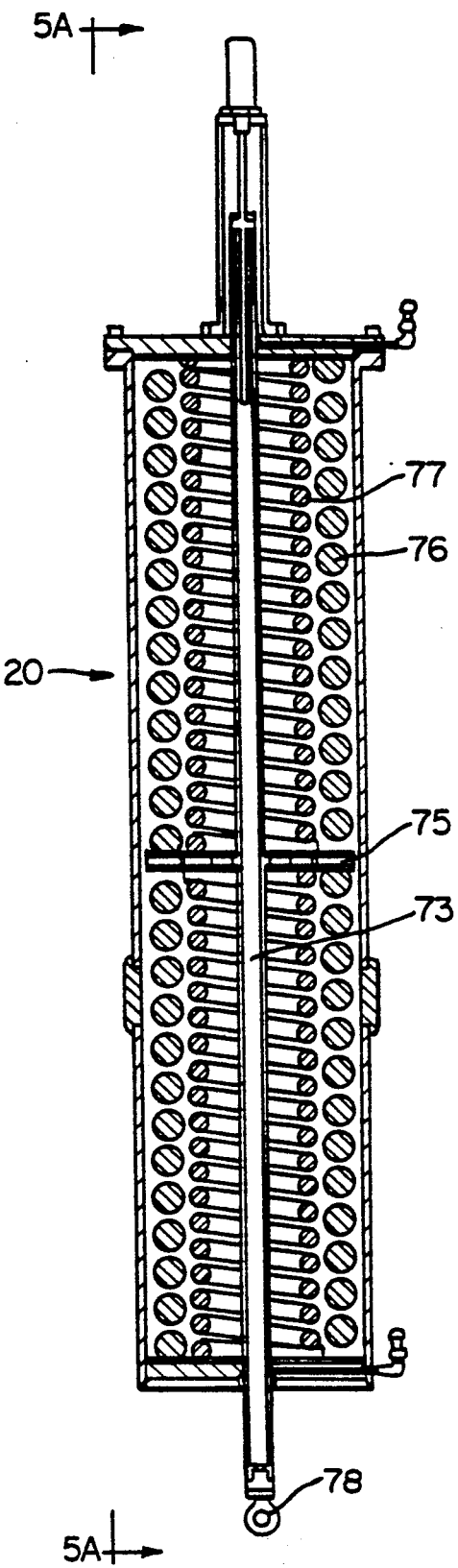
FIG. 5 is a section view of one of the pair of spring mechanisms.

FIG. 5 illustrates in section view one of the spring mechanisms 20 which includes spring mechanism rod 73 which engages via central disc 75 a pair of internally caged springs 76, 77. The lower portion of rod 73 includes annular opening 78 for attachment by means of the not shown pin 24A with clasp 43 and respective laterally extending arm 24. FIG. 5A illustrates a pair of trunnions 79 which attach spring mechanism 20 rotatably to a stationary portion of oscillatory motion means 18. The spring mechanisms 20 are designed to react the full braking torque effected by braking means 16 and also to react the small amount of torque load cell or braking load receiving mechanism movement generated by hydraulic cylinders 22. Spring mechanisms 20 allow arms 24, torque armature end plate 41, torque load cell 54, piston housing 40, torque tube 29 and stators 27 to undergo controlled motion during braking and operation of hydraulic cylinders 20.

In operation, the sinusoidal motion of the braking mechanism's "stationary" parts (stators 27, pressure plate 60 and backing plate 61, torque tube 29, insulator tube 70, heater support cylinder 90, piston housing 40, load cell 54, torque armature end plate 41 connected to lateral arms 24, hydraulic cylinders 22, and spring mechanisms 20) causes an oscillation of the mean slip velocity at the friction pair interface. If the output torque of the friction pair (rotor 25 and stators 27) is sensitive to instantaneous slip speed, this will also generate an output delta torque given by:

$$\delta T = T_A \sin(\text{tin} + \phi) \quad (1)$$

For the input delta slip velocity (in angular velocity units) of:

$$\dot{\delta} = V_\Theta \sin \omega t \quad (2)$$

Equation (1) can be rewritten as follows:
$$\delta T = (T_A \cos\phi)\sin\omega t + (T_A \sin\phi)\cos\omega t \quad (3)$$

The negative damping of the friction pair is given by:

$$C_N = -T_A \cos\phi / V_\Theta \quad (4)$$

All of these operations are carried out by utilizing a high speed data acquisition system to feed data to a dedicated digital computer. Referring to FIG. 6, a system schematic of test mechanism 10 comprises control and display console 121 which enables control of the various components of mechanism 10 and provides current status displays and information such as brake torque, brake pressure, brake effectiveness, brake velocity, all versus time, which is displayed on the control console. This information and additional information can be provided in data summaries from the computer printer and plotter 122. Control and display console 121 is connected with shaft dynamometer 12 which is connected with brake friction pair 25, 27. Stators 27 are connected operatively with brake piston housing 40 which effects a torque reaction to torque load cell 54. Hydraulic cylinders 22 are connected (via arms 24) with torque armature end plate 41 which is connected with torque load cell 54. Hydraulic pump and accumulator mechanism 124 provides fluid pressure via line 126 to hydraulic valve 125 that is controlled via line 127. Valve 125 controls hydraulic pressure fed to brake pistons 50 in housing 40 via brake pressure line 129. Return pressure is transmitted via line 131 to hydraulic pump and accumulator 124. Connected with brake pressure line 129 is hydraulic pulse generator 130 which will be explained in detail below. Brake piston housing 40 includes one or more pressure transducers 141 to provide a readout of braking pressure to the high speed data acquisition system 190. High speed data acquisition system 190 comprises an analog to digital high speed converter system. System 190 receives torque input via line 155, acceleration input via line 156 and acceleration transducer 149, hydraulic cylinder pressure input via line 161 and a sinusoidal velocity input via line 162, the last two inputs effected via respective transducers 163 and 164. The sinusoidal velocity input via line 162 is the sinusoidal velocity of hydraulic cylinders 22. The velocity of the shaft dynamometer 12 is inputted via line 171 and the temperature of friction pair 25, 27 is inputted via line 172 as determined by temperature transducer 173. The data acquired and converted by acquisition system 190 is transmitted to digital computer 120 which includes permanent memory storage 123 and a computer printer and plotter 122 which provides data summaries, graphs and tables.

Sine wave generator 116 is connected via summing unit 119 to electrohydraulic servo valve 115. Hydraulic pump and accumulator 117 provides via valve 128 hydraulic pressure to electrohydraulic servo valve 115. Return pressure is provided to hydraulic pump and accumulator 117 by line 133. The sine wave generator effects a request signal for displacement via line 137 which proceeds through summing unit 119 to electrohydraulic servo valve 115. The electrohydraulic servo valve provides pressure in the form of a sinusoidal pressure variation to hydraulic cylinders 22 via connection line 139. Acceleration transducer 149 is connected with torque load cell 54 and torque armature end plate 41 and provides an input to the data acquisition system 190 via line 156, and also feeds back acceleration data via line 151 to double integrator 161 which is connected with summing unit 119. This provides a displacement feedback to summing unit 119 for comparison with the displacement signals emitted by sine wave generator 116. The control and display console 121 contains control connection 116A for sine wave generator 116, connection 125A for valve 125, connection 130A for pulse generator 130, connection 128A for valve 128, and connection 80A for heaters 80 and 83. Control and display console 121 receives velocity and pressure feedback information via line 128B and line 127 for valves 128 and 125. Motor control connection 129 controls shaft dynamometer 112 and provides a feedback to control and display console 121.

Data on negative damping can also be organized as functions of brake slip speed, brake temperature, brake pressure, brake wear life stage and possibly other variables. In addition to negative damping data, torque/pressure response and torque/temperature response data, other basic performance data of the friction pair can be evaluated, such as: wear rate, static torque, peak torque, torque model, brake effectiveness (average), peak brake effectiveness, torque index and tendency to grabbiness Because test mechanism 10 requires only one rotor and two stators, it is much more economical to operate and establish the friction pair characteristics rather than a full scale brake which might have six rotors, five stators, a pressure plate and a backing plate. Another significant advantage of the invention is that it is full size brake. Attempts to obtain the same types of data on subscale samples have not been satisfactory because of scaling effects.

Referring to FIGS. 1, 3 and 6, operation of the test mechanism is as follows. Dynamometer 12 can be actuated and controlled via control and display console 121. Inertia section 15 of dynamometer 12 rotates wheel element 14 at the desired angular velocity. When braking is to be effected, valve 125 is actuated to feed brake pressure via line 129 to line connection 57, manifold 58, connections 59 and brake pistons 50. Brake pistons 50 extend to compress rotating rotor 25 between stators 27 and plates 60, 61. Sine wave generator 116 is activated to send a request signal for oscillatory displacement via line 137 to electrohydraulic servo valve 115. Valve 115 emits a sinusoidal pressure variation via connection 139 to hydraulic cylinders 22 which, because of their crisscross connection, effect through arms 24 and torque armature end plate 41 an oscillatory motion of plus or minus 2° of torque load cell 54 and piston housing 40. The range of oscillatory motion can be modified as desired via control and display console 121. This sinusoidal oscillation is transmitted to these "stationary parts" or braking load receiving means of braking means 16 so that plate 41, torque load cell 54, piston housing 40, torque tube 29, insulator tube 70, pistons 50, pressure plate 60, backing plate 61, and stators 27 are oscillated as desired. The slight oscillatory motion of the braking load receiving means causes a perturbation in braking torque. From the oscillatory motion signal and the torque perturbation, the negative damping is determined as previously described. It is also important to understand the relationship between changes in temperature and pressure in order to provide a complete understanding of frictional properties. Thus, at different hydraulic pressures and temperatures test mechanism 10 can be operated to determine such affects upon negative damping. Heater elements 80, 83 may be energized via connection 80A in order to provide and maintain a temperature within the friction pair and which approximates the realistic temperature of an actual aircraft brake. As illustrated, the heating elements can be disposed both about the circumferential interior of braking mechanism 16 and about pressure plate 60 and backing plate 61. Additionally, if desired, heating elements can be located circumferentially about or within stators 27.

Figure 7:
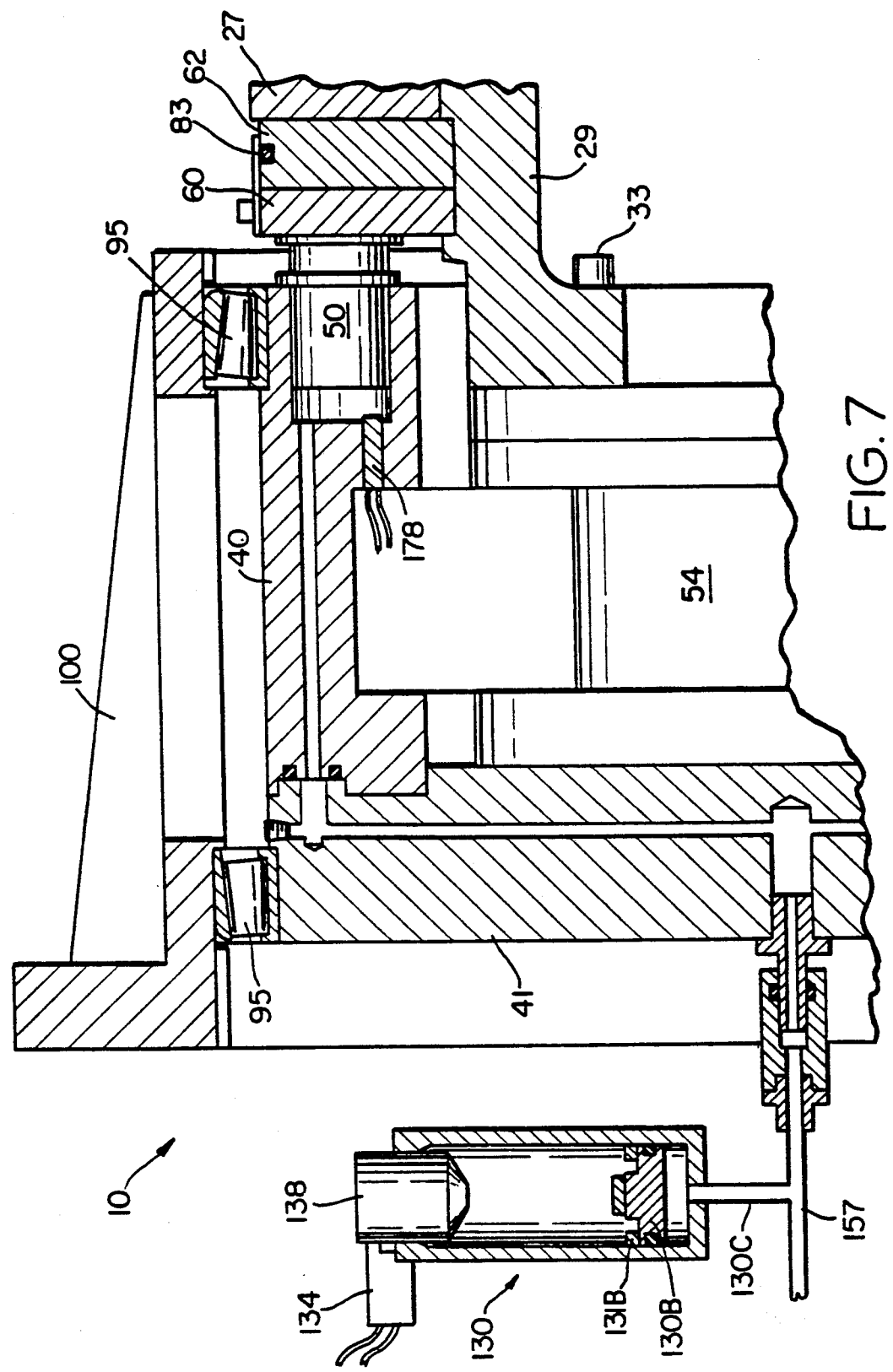
FIG. 7 is a section view of a hydraulic pulse generator of the frictional properties test mechanism.

Referring to FIG. 7, there is illustrated an additional feature of test mechanism 10. In order to determine the torque to pressure frequency response function, it is necessary to apply a sharp pulse to the steady state hydraulic pressure during a braking stop effected by mechanism 10. The sharp pulse and pressure causes a pulse in the steady state brake torque. The signals from the pulse-in-pressure and the pulse-in-torque may be simultaneously fed into a dual channel Fast Fourier Transform (FFT). The FFT analyzer determines the frequency response function between the pressure and resulting torque pulse. This frequency response function is a complex function of frequency which can be represented graphically as a torque-to-pressure gain versus frequency and a phase lag of torque-to-pressure versus frequency. It can also be represented as the ratio of two complex transfer functions as follows:

$$\frac{T}{P} = \frac{f_1(S)}{f_2(S)} = \frac{a_0 + a_1 S + a_2 S^2 + \cdots}{b_0 + b_1 S + b_2 S^2 + \cdots}$$

Where S is the Laplace transform complex variable (S=R+iI).

To achieve the above creation of a sharp hydraulic pressure pulse, pulse generator 130 is illustrated in FIGS. 6 and 7. Pulse generator 130 may comprise any of several different mechanisms, one of which is illustrated herein. Pulse generator 130 may comprise trigger mechanism 134 which may be actuated by control and display console 121 to effect the dropping of mass 138 onto piston 130B. Piston 130B is positioned against stop 131B. Generator 130 is connected via line 130C to hydraulic pressure supply line 157. Pressure supply line 157 is connected to the back of torque armature end plate 41 and piston housing 40 which contain equal length line connections with pistons 50 so that the same pressure pulse is received by each piston 50. This assures a translational compression of the brake heat stack with essentially no angular motion. Pressure transducer 178 (FIG. 7) provides an output signal to control and display console 121. When mass 138 is dropped on piston 130B, a sharp pressure pulse is effected which can yield a frequency response function over a relatively wide frequency range. Pressure pulse width and magnitude can be controlled by adjustment of piston 130B, the drop height of mass 138, and the mass of mass 138. Generator 130 may also be utilized in a standard dynamometer brake test device in order to determine the torque to pressure frequency response function. The standard dynamometer test device would not include the oscillatory or perturbation motion means 18 and control components associated with the oscillatory motion means.

We claim:

1. A brake test mechanism, comprising means for providing inertial rotary motion, a wheel element attached to the inertial rotary motion means, means for effecting braking of said wheel element and including braking load receiving means, means for creating oscillatory motion of said braking load receiving means, and means for controlling the test mechanism and for data acquisition, so that rotation of said wheel element by the inertial rotary motion means and operation of the oscillatory motion means to effect oscillatory motion of the braking load receiving means during operation of the braking means enables the acquisition of data relative to the operation of said braking means.

2. The mechanism in accordance with claim 1, wherein the braking means comprises a disc brake having at least one rotor and two stators.

3. The mechanism in accordance with claim 2, wherein means for effecting heating is disposed adjacent the circumference of said stators.

4. The mechanism in accordance with claim 1, wherein the braking load receiving means comprises a piston housing and torque load cell which are connected with the oscillatory motion means.

5. The mechanism in accordance with claim 4, wherein the piston housing and torque load cell are mounted by means of bearings within a stationary framework.

6. The mechanism in accordance with claim 1, wherein said braking means includes means for effecting heat.

7. The mechanism in accordance with claim 1, wherein the data acquisition means comprises a high speed data acquisition system connected with computer means that includes a permanent memory storage and means for providing data output.

8. The mechanism in accordance with claim 1, wherein the oscillatory motion means comprises a pair of hydraulic cylinders and a pair of spring mechanisms connected with said braking load receiving mechanism.

9. The mechanism in accordance with claim 8, wherein the oscillatory motion means comprises a sine wave generator connected with an electrohydraulic servo valve that is connected with said hydraulic cylinders.

10. The mechanism in accordance with claim 9, wherein the sine wave generator is connected with the electrohydraulic servo valve by means of a summing mechanism which receives displacement information from a transducer connected with the braking load receiving mechanism.

11. The mechanism in accordance with claim 1, further comprising means for generating a pressure pulse which is transmitted to said braking means to effect a pulse in braking torque.

12. The mechanism in accordance with claim 1, wherein the braking load receiving means comprises a torque tube.

13. The mechanism in accordance with claim 1, wherein the braking load receiving means includes an insulator tube disposed within a torque tube.

14. The mechanism in accordance with claim 13, further comprising means for effecting heat and which is disposed between said insulator tube and torque tube.

15. The mechanism in accordance with claim 1, further comprising bearing means disposed between said braking load receiving means and a stationary part of said test mechanism, such that said braking load receiving means may be rotatably displaced by said oscillatory motion means.

16. The mechanism in accordance with claim 15, wherein the oscillatory motion means comprises a pair of hydraulic cylinders and a pair of spring mechanisms connected with the braking load receiving means.

17. The mechanism in accordance with claim 1, further comprising a hydraulic pressure generating mechanism connected with a hydraulic valve that transmits hydraulic pressure to said braking means, the hydraulic valve being controlled by said controlling and data acquisition means.

18. The mechanism in accordance with claim 17, further comprising means for generating a pressure pulse which is transmitted to said braking means to effect a pulse in braking torque.

19. The mechanism in accordance with claim 1, wherein the oscillatory motion means comprises a sine wave generator connected with an electrohydraulic servo valve that is connected with hydraulic cylinders attached to said braking load receiving means, and pressure generating means which is connected with a hydraulic valve that transmits hydraulic pressure to said servo valve, the hydraulic valve being controlled by said control and data acquisition means.

20. The mechanism in accordance with claim 1, wherein the controlling means effects operation of said inertial rotary motion means, operates said oscillatory motion means, and effects operation of said braking means.

21. A frictional properties test mechanism, comprising a shaft dynamometer for providing inertial rotary motion, a wheel element attached to the shaft dynamometer, braking means for effecting braking of said wheel element and including a braking load receiving mechanism, means for creating oscillatory motion of said braking load receiving mechanism and including a pair of hydraulic cylinders and a pair of spring mechanisms, and means for controlling the test mechanism and for data acquisition, so that rotation of said wheel element by the shaft dynamometer and operation of the oscillatory motion means to effect via the hydraulic cylinders and spring mechanisms an oscillatory motion of the braking load receiving mechanism during operation of the braking means enables the acquisition of frictional property data relative to the operation of said braking means.

22. A method for determining data relating to the operation of a brake which includes means for receiving braking load, comprising the steps of operating means for creating inertial rotary motion which is connected with a wheel element connected to said brake, effecting operation of said brake in order to brake said wheel element, transmitting perturbation motion to the braking load receiving means of said brake in order to effect a perturbation in the braking torque of the brake, and determining data from the operation of said brake.

23. The method in accordance with claim 22, wherein said inertial rotary motion means comprises a dynamometer which is attached to said wheel element.

24. The method in accordance with claim 22, further comprising the step of creating a hydraulic pressure pulse within a hydraulic circuit of said brake in order to determine a brake torque to hydraulic pressure frequency response function.

25. The method in accordance with claim 22, wherein said brake comprises a disc brake having at least one rotor and two stators.

26. The method in accordance with claim 22, further comprising the step of heating said brake in order to effect a realistic operating temperature thereof.

27. The method in accordance with claim 22, wherein the perturbation motion is transmitted to the braking load receiving means via a pair of hydraulic cylinders and a pair of spring mechanisms.

28. The method in accordance with claim 27, wherein the braking load receiving means comprises a torque tube.

29. The method in accordance with claim 22, wherein the step of transmitting perturbation motion to the braking load receiving means includes the step of operating a sine wave generator which is connected with an electrohydraulic servo valve that is connected with hydraulic cylinders attached to said braking load receiving means.

30. The method in accordance with claim 29, further comprising the step of creating selectively a hydraulic pressure pulse within a hydraulic circuit of said brake in order to determine a brake torque to hydraulic pressure frequency response function.

31. The method in accordance with claim 22, further comprising the step of sensing the acceleration of said braking load receiving means and transmitting a double integration of the acceleration to means for effecting the perturbation motion of the braking load receiving means.

32. A brake test mechanism, comprising means for providing inertial rotary motion, a wheel element attached to the inertial rotary motion means, means for effecting braking of said wheel element and including braking load receiving means, means for generating a sharp pressure pulse which is transmitted to the braking means to effect a pulse in braking torque, and means for controlling the test mechanism and for data acquisition, so that rotation of said wheel element by the inertial rotary motion means and operation of the pulse generating means to effect a pulse in the braking torque during operation of the braking means enables the acquisition of data relative to the operation of said braking means.

33. The brake test mechanism in accordance with claim 32, wherein the pulse generating means comprises a mechanism that engages a mass with a piston that communicates with a hydraulic line of the braking means.

34. The brake test mechanism in accordance with claim 32, wherein the data acquired relates to a braking torque and pressure frequency response function represented by the equation:

$$\frac{T}{P} = \frac{f_1(S)}{f_2(S)} = \frac{a_0 + a_1 S + a_2 S^2 + \cdots}{b_0 + b_1 S + b_2 S^2 + \cdots}.$$

35. The brake test mechanism in accordance with claim 34, wherein the test mechanism further comprises means for generating oscillatory motion of said braking load receiving means, operation of the oscillatory motion means during operation of the braking means enabling the acquisition of frictional property data relative to the operation of said braking means.

* * * * *